United States Patent
Gordon

(10) Patent No.: US 11,110,951 B2
(45) Date of Patent: Sep. 7, 2021

(54) CONVERTIBLE WALKER AND STROLLER

(71) Applicant: Anna Gordon, La Belle, FL (US)

(72) Inventor: Anna Gordon, La Belle, FL (US)

( * ) Notice: Subject to any disclaimer, the term of this patent is extended or adjusted under 35 U.S.C. 154(b) by 0 days.

(21) Appl. No.: 16/567,801

(22) Filed: Sep. 11, 2019

(65) Prior Publication Data
US 2020/0079413 A1 Mar. 12, 2020

Related U.S. Application Data

(60) Provisional application No. 62/729,483, filed on Sep. 11, 2018.

(51) Int. Cl.
*B62B 7/10* (2006.01)
*B62B 7/12* (2006.01)
*A47D 13/04* (2006.01)

(52) U.S. Cl.
CPC ............ *B62B 7/12* (2013.01); *A47D 13/04* (2013.01)

(58) Field of Classification Search
CPC ...... A47D 13/043; A47D 13/04; A47D 13/08; B62B 7/04; B62B 7/12
See application file for complete search history.

(56) References Cited

U.S. PATENT DOCUMENTS

| | | | | |
|---|---|---|---|---|
| 2,276,792 A | * | 3/1942 | Peltier | A47D 13/043 280/7.1 |
| 2,415,146 A | * | 2/1947 | Nanna | A47D 13/043 280/7.1 |
| 2,427,550 A | * | 9/1947 | Collura | B62B 7/04 280/47.41 |
| 2,606,593 A | * | 8/1952 | Beurskens | A47D 13/043 280/7.1 |
| 2,907,372 A | * | 10/1959 | Leger | A47D 13/043 280/7.1 |
| 3,222,081 A | * | 12/1965 | Harmon, Jr. | B62B 9/26 280/648 |
| 4,359,242 A | * | 11/1982 | Gerken | A47D 13/107 280/649 |
| 5,054,851 A | * | 10/1991 | Chiu | A47D 13/043 297/136 |
| 5,411,279 A | * | 5/1995 | Magid | A47D 13/043 198/833 |
| 5,463,855 A | * | 11/1995 | Johnson | A01B 73/00 16/19 |
| 5,728,030 A | | 3/1998 | Hsieh | |
| 5,813,681 A | * | 9/1998 | Saint | A47D 13/043 188/20 |

(Continued)

*Primary Examiner* — Hau V Phan
(74) *Attorney, Agent, or Firm* — Boudwin Intellectual Property; Daniel Boudwin

(57) ABSTRACT

A convertible walker and stroller device includes a base having a plurality of wheels affixed thereto and a platform movably connected to the base via a height adjustment mechanism. A pair of openings disposed on the platform are adapted to receive a pair of legs of an occupant therethrough. The platform is configured to move between an extended position and a retracted position, wherein the platform contacts an upper side of the base when the platform is in the retracted position, and wherein a gap is defined between the base and the platform when the platform is in the extended position. The device can be selectively switched between walker and stroller configurations, providing multiple ways to transport an infant or small child in a single device.

18 Claims, 2 Drawing Sheets

(56) References Cited

U.S. PATENT DOCUMENTS

| | | | | |
|---|---|---|---|---|
| 6,231,056 B1* | 5/2001 | Wu | ............... | A47D 13/043 |
| | | | | 280/7.17 |
| 6,796,001 B1* | 9/2004 | Finkelstein | ......... | B60B 33/0002 |
| | | | | 16/19 |
| 6,817,864 B1* | 11/2004 | Martinez | ............... | A47D 13/08 |
| | | | | 434/258 |
| 6,896,575 B2* | 5/2005 | Fair | ............... | A63H 33/006 |
| | | | | 297/16.1 |
| 7,025,364 B1* | 4/2006 | Clarke | ............... | A47D 13/04 |
| | | | | 280/47.38 |
| 7,287,768 B2* | 10/2007 | Myers | ............... | A47D 13/107 |
| | | | | 280/87.051 |
| 7,350,269 B2* | 4/2008 | Dominic | ............... | B60B 33/0002 |
| | | | | 16/19 |
| 7,523,984 B2* | 4/2009 | Steininger | ............... | A47D 3/001 |
| | | | | 297/16.1 |
| 8,016,312 B2* | 9/2011 | MacEachern | ............... | B62H 1/04 |
| | | | | 280/300 |
| 8,162,333 B1* | 4/2012 | Bartlett | ............... | A47D 13/043 |
| | | | | 280/87.05 |
| 8,303,033 B2* | 11/2012 | Lundeen | ............... | A47D 13/107 |
| | | | | 297/5 |
| 8,505,957 B2 | 8/2013 | Bizzell et al. | | |
| 9,365,231 B1* | 6/2016 | Rajput | ............... | B62B 7/08 |
| 9,701,331 B2* | 7/2017 | Burns | ............... | B62B 7/04 |
| D868,900 S * | 12/2019 | Healy | ............... | A47D 3/001 |
| | | | | D21/419 |
| 2004/0119258 A1* | 6/2004 | Yoo | ............... | A47D 1/004 |
| | | | | 280/87.051 |
| 2011/0018216 A1* | 1/2011 | Cheng | ............... | A47D 13/04 |
| | | | | 280/87.051 |

* cited by examiner

CONVERTIBLE WALKER AND STROLLER

CROSS REFERENCE TO RELATED APPLICATIONS

This application claims the benefit of U.S. Provisional Application No. 62/729,483 filed on Sep. 11, 2018. The above identified patent application is herein incorporated by reference in its entirety to provide continuity of disclosure.

BACKGROUND OF THE INVENTION

The present invention relates to child walker and stroller devices. More specifically, the present invention provides a convertible walker and stroller device that can either be used as a stroller or a walker that can be quickly and easily changed between the two configurations.

Multiple modes of transportation exist for infants and younger children. Parents and guardians often transport children by pushing them in strollers. When not being pushed by the parent or guardian in a stroller, infants and younger children are often placed within walker devices that allow them freedom of movement while providing support. While both walkers and strollers are convenient and often necessary accessories for child rearing, it can be prohibitively expensive to have both of these types of devices on hand. Additionally, it can be difficult to store and transport separate walker and stroller devices. Parents or guardians may choose to only use one device at a time rather than carry the extra weigh of both devices, to the detriment of the child. In view of the above, it is desirable to provide a convertible walker and stroller device that can maintain either a walker configuration or a stroller configuration depending upon the needs of the user.

In light of the devices disclosed in the known art, it is submitted that the present invention substantially diverges in design elements from the known art and consequently it is clear that there is a need in the art for an improvement to existing walker and stroller devices. In this regard the present invention substantially fulfills these needs.

SUMMARY OF THE INVENTION

In view of the foregoing disadvantages inherent in the known types of walkers and strollers now present in the prior art, the present invention provides a convertible walker and stroller wherein the same can be utilized for providing convenience for the user when providing a reconfigurable transportation device for an infant or young child. In an exemplary embodiment, the convertible walker and stroller includes a base having a plurality of wheels affixed thereto and a platform movably connected to the base via a height adjustment mechanism. A pair of openings disposed on the platform are adapted to receive a pair of legs of an occupant therethrough. The platform is configured to move between an extended position and a retracted position, wherein the platform contacts an upper side of the base when the platform is in the retracted position, and wherein a gap is defined between the base and the platform when the platform is in the extended position.

An object of the present invention is to provide a convertible walker and stroller device that has the advantages of both a walker and a stroller in a single package.

Another object of the present invention is to provide a convertible walker and stroller device that has an adjustable seating area, such that the seat can support an occupant thereon, or be moved to expose leg apertures to allow the occupant's legs to extend toward the floor.

A further object of the present invention is to provide a convertible walker and stroller device that has a height adjustable platform and height adjustable wheels, allowing the device to be converted between operational modes quickly and easily.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
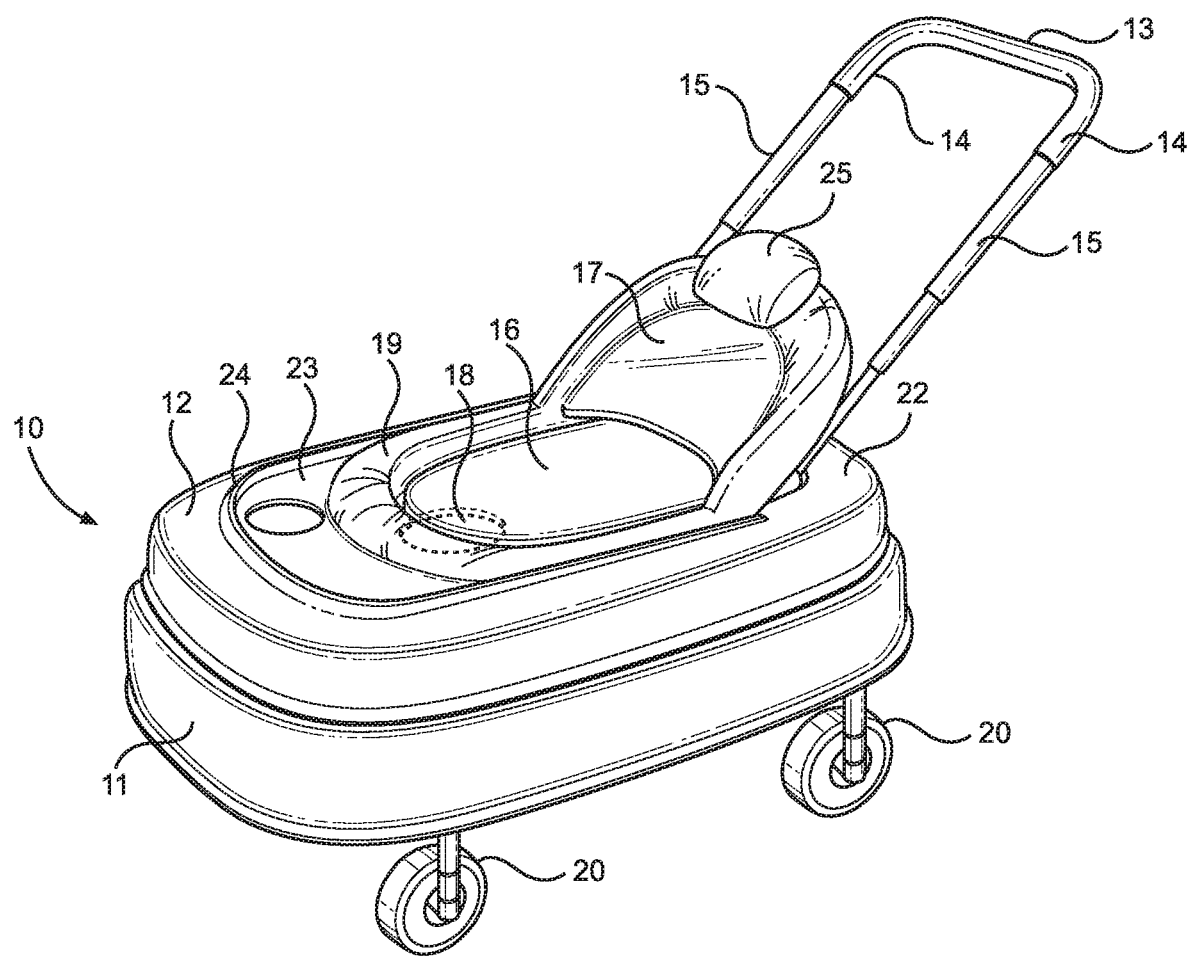
FIG. 1 shows a perspective view of an embodiment of the convertible walker and stroller in the stroller configuration.

Reference is made herein to the attached drawings. Like reference numerals are used throughout the drawings to depict like or similar elements of the convertible walker and stroller. For the purposes of presenting a brief and clear description of the present invention, the preferred embodiment will be discussed as used for providing a mobile platform for a child that can be pushed by a guardian in a stroller configuration or used alone in a walker configuration. The figures are intended for representative purposes only and should not be considered to be limiting in any respect.

Figure 3:
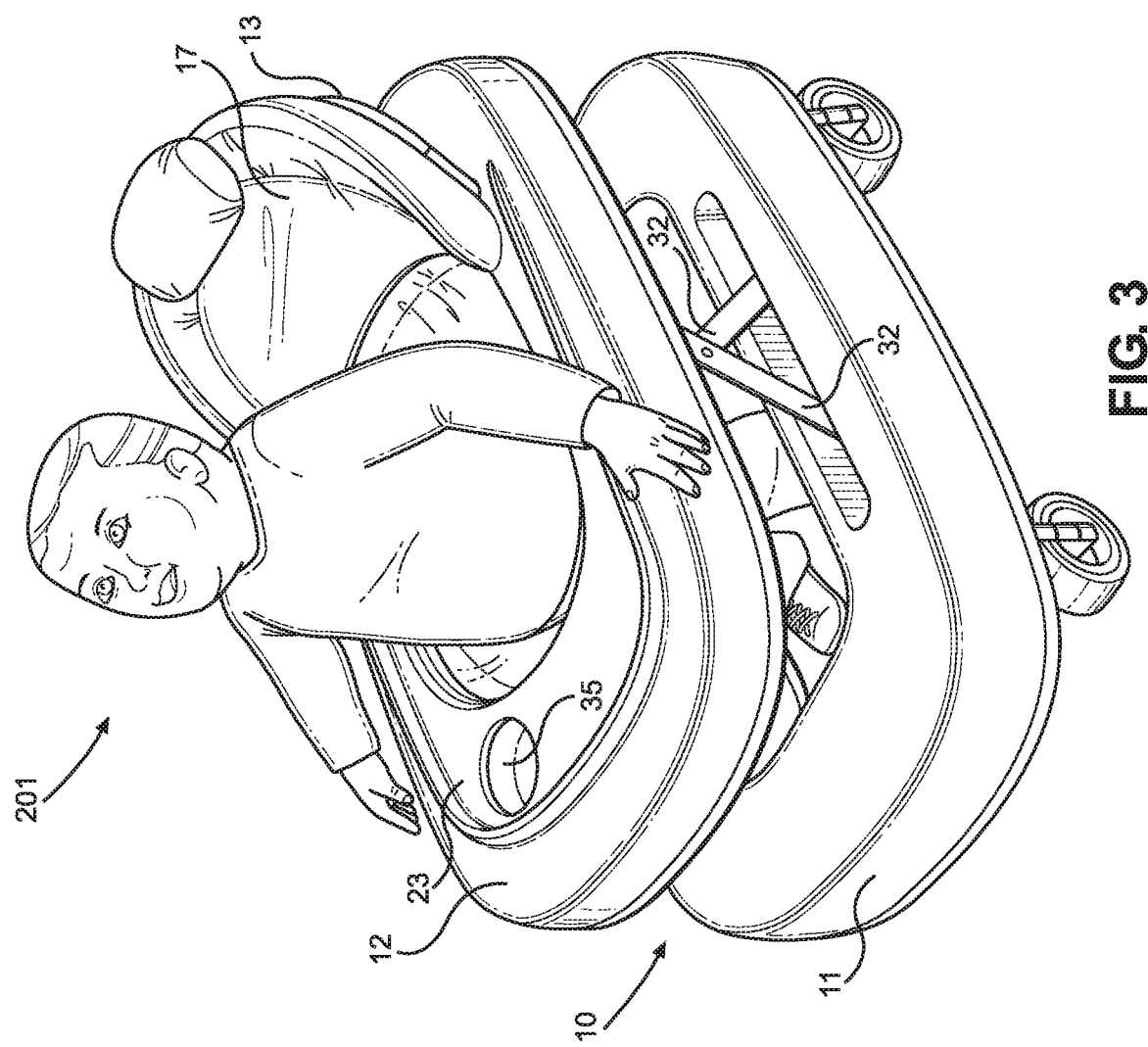
FIG. 3 shows a perspective view of an embodiment of the convertible walker and stroller in the walker configuration.

Referring now to FIG. 1, there is shown a perspective view of an embodiment of the convertible walker and stroller in the stroller configuration. The convertible walker and stroller device 10 can be quickly and easily converted between walker and stroller configurations. The device 10 generally includes a base 11 having a plurality of wheels 20 affixed thereto. A platform 12 is movably connected to the base 11. When the device 10 is in the stroller configuration, as shown in FIG. 1, the platform 12 rests on an upper surface of the base 11. The overall area of the platform 12 is slightly reduced in size compared to the size of the base 11, such that the platform 12 can be effectively supported on the base 11. The wheels 20 are height adjustable as well, such that the entire device 10 can be raised further above the ground when in the stroller configuration, as shown in FIG. 1, and lowered back toward the ground when in the walker configuration, as shown in FIG. 3.

Figure 2:
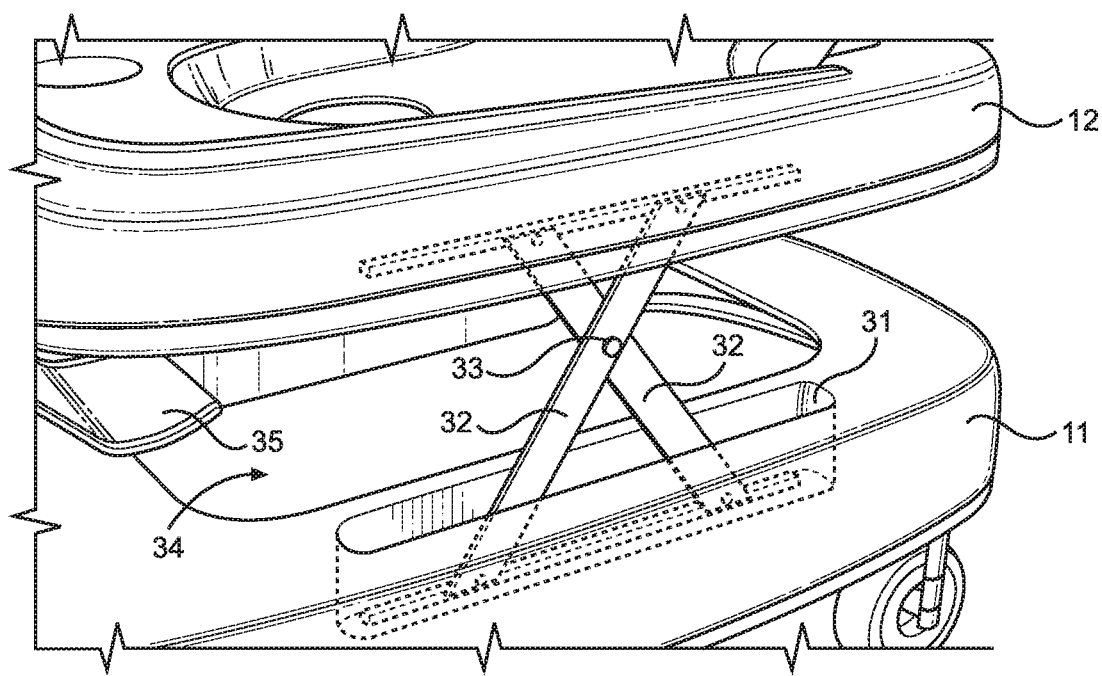
FIG. 2 shows a perspective view of an embodiment of the convertible walker and stroller detailing the height adjustment mechanism.

The convertible walker and stroller device 10 includes a seating area 19 that provides support for the occupant when the device 10 is in either the stroller or walker configuration. A lower end of the seating area 19 includes one or more openings 18 for receiving the legs of the user therethrough. In some embodiments, and as shown in FIG. 2, the device 10 includes retractable footrests disposed underneath the platform 12, which can be extended to provide a footrest for occupants when the device 10 is in the stroller configuration, and retracted for storage when the device 10 is in the walker configuration. The seat portion 19 also includes a removable seat cushion 16 that supports the user's bottom and a seat back 17 that provides a back rest for the user. In some embodiments, the seat back 17 includes an additional head cushion 25 for added comfort. Additionally, in some embodiments, the angle of the seat back 17 is adjustable so as to adjust the seat portion 19 for optimal comfort.

The seat cushion 16 can be placed within the seating area 19 to support the occupant in a laying or seating position, and can be removed to allow access the to the leg apertures 18, allowing the occupant to extend their legs toward the ground or rest them on the foot rests. In some embodiments, the seat cushion 16 is adjustably positioned within the seating area 19, such that it can be slid rearwardly to access the leg apertures 18. In other words, the seat cushion 16 can be slid rearwardly under the seat back 17 to allow the occupant to extend their legs through the leg apertures 18 and rest their feet on the footrests if desired. This effectively provides to operational modes for the stroller configuration, wherein the seat cushion 16 can provide a flat surface to sit or lay on when installed, and provide access to the leg apertures to let the feet hang down when the cushion 16 is slid rearwardly.

In the illustrated embodiment, the device 10 further includes a tray 23. The tray 23 can be utilized to support items thereon such that they are easily accessible by the occupant. In the illustrated embodiment, the tray 23 is integral to the platform 12, but may be removably secured to the platform 12 in other embodiments. The tray 23 includes a perimeter lip 24 that helps to retain items on the surface of the tray 23. Further, in the shown embodiment, the tray 23 includes a recessed receptacle 35 that can be utilized to support beverage containers or any other suitable items. In other embodiments, other configurations including additional receptacles or storage areas may be utilized for the tray 23.

The convertible walker and stroller device 10 further includes a handlebar 13 that can be utilized to push or pull the device 10 when it is in the stroller configuration. The handlebar 13 is movable between an extended position for use in the stroller configuration and a retracted position for storage when the device 10 is in the walker configuration, as shown in FIG. 3. To accomplish this, two opposing perpendicular ends 14 of the handlebar 13 each connect to a telescopically adjustable support 15 that extends rearwardly from a rear end 22 of the platform 12. The telescopically adjustable supports 15 allow the handlebar 13 to be positioned at a desired distance from the device 10 for comfort during use, or for storage when not in use. In other embodiments, the supports 15 can be attached to the base 11 rather than the platform 12.

Referring now to FIG. 2, there is shown a perspective view of an embodiment of the convertible walker and stroller detailing the height adjustment mechanism. The height adjustment mechanism allows the device to be moved between walker and stroller configurations. In the illustrated embodiment, the height adjustment mechanism comprises a pair of pivoting connectors 32 each having an upper end connected to the platform 12 and a lower end connected to the base 11. The upper and lower ends of the connectors 32 pivotally and slidably engage a track, and the connectors 32 are pivotally connected at a midpoint 33. The pivoting connectors 32 can collapse downwardly until the platform 12 is supported on the base 11 for use in the stroller configuration. The pivoting connectors 32 can likewise be expanded upwardly to support the platform 12 above the base 11, such that a gap is defined therebetween, allowing the device to be used in the walker configuration. In other embodiments, other height adjustment mechanisms may be utilized to adjust the position of the platform 12 with respect to the base 11, such as linear actuators, gas pistons, or the like.

The base 11 comprises an annular member having an open central area 34. The open central area 34 provides an area for the occupant's legs to move around freely, while the annular member forming the base 11 serves as a bumper to protect the occupant from impacts with other objects while moving around with the device 10 in the walker configuration. Additionally, a footrest 35 is positioned between the platform 11 and the base 12. The footrest 35 may be retractable to a stored position or may be fixedly attached to the device 10. The footrest 35 provides a support surface for the occupant's feet when the occupant's legs extend through the leg apertures of the seating area. In this way, the occupant can either support their feet on the ground within the open central area 23 of the base 11 if using the device 10 as a walker, or support their feet on the footrests 35 if using the device 10 as a stroller with the seat cushion slid rearwardly to allow access to the leg apertures 18.

Referring now to FIG. 3, there is shown a perspective view of an embodiment of the convertible walker and stroller in the walker configuration. When the pivoting connectors 32 are extended and the wheels 20 lowered, the platform 12 is separated from the base 11, allowing the device 10 to be utilized by an occupant 201 as a walker. The tray 23 and receptacle 35 are easily accessible when in the walker configuration, while the base 11 provides a bumper to protect the legs of the occupant. The occupant's legs extend through the one or more leg apertures, such that the occupant's body is surrounded by the remaining area of the lower end of the seating portion, thereby retaining the occupant in an upright position and assisting with standing and walking movements.

Figure 4:
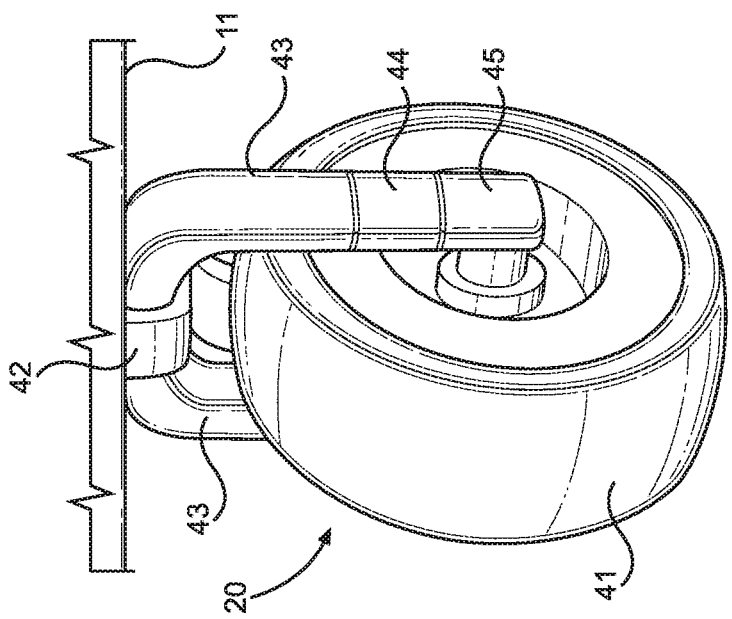
FIG. 4 shows a perspective view of a wheel assembly of an embodiment of the convertible walker and stroller.

Referring now to FIG. 4, there is shown a perspective view of a wheel assembly of an embodiment of the convertible walker and stroller. In the illustrated embodiment, the wheel assemblies 20 are height adjustable via a plurality of removable spacers 44. The wheel assemblies 20 include a pivoting castor 42 having a pair of support arms 43 extending downwardly therefrom. The spacers 44 are removably securable between the support arms 43 and the axle connectors 45 that connect to the axle of the wheel 41. In other embodiments, the wheel assemblies 20 are height adjustable via other mechanisms, such as telescopic support arms, linear actuators, gas pistons, or any other suitable height adjustment mechanism. In this way, both the wheel height and the platform height can be adjusted to effectively combine a walker and stroller into a single reconfigurable device.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A convertible walker and stroller device, comprising:
   a base having a plurality of wheels affixed thereto;
   a platform movably connected to the base via a height adjustment mechanism;
   a pair of openings adapted to receive a pair of legs of an occupant therethrough;
   a seat portion that is removably securable to the platform, wherein the seat portion comprises a seat cushion and a seat back, wherein the seat cushion is removably disposed on the platform, wherein the seat cushion includes a forward portion in front of the seat back that covers the pair of openings and a rearward portion extending rearwardly toward a rear end of the platform such that the rearward portion extends underneath the seat back while contacting a rear portion of the platform, wherein the pair of openings are disposed on a lower portion of the seat portion beneath the seat cushion;
   wherein the platform is configured to move between an extended position and a retracted position;
   wherein the platform contacts an upper side of the base when the platform is in the retracted position, and wherein a gap is defined between the base and the platform when the platform is in the extended position.

2. The device of claim 1, wherein the height adjustment mechanism comprises a pair of pivoting connectors each having an upper end connected to the platform and a lower end connected to the base.

3. The device of claim 2, wherein the pivoting connectors extend through a slot on the base.

4. The device of claim 1, wherein the base comprises an annular member defining an open central area.

5. The device of claim 1, wherein the seat back of the seat portion comprises a head cushion affixed thereto.

6. The device of claim 1, further comprising a handle extending rearwardly from a rear end of the platform.

7. The device of claim 6, wherein the handle comprises a handle bar having a pair of perpendicular opposing ends, wherein each opposing end is connected to a telescopically adjustable support arm, such that the handle bar is configured to selectively move between an extended position and a retracted position, wherein each telescopically adjustable support arm contacts a rear side of the seat cushion.

8. The device of claim 1, wherein the platform comprises a tray integral thereto, wherein the tray comprises a raised perimeter lip.

9. The device of claim 8, wherein the tray comprises at least one receptacle thereon.

10. A convertible walker and stroller device, comprising:
    a base having a plurality of wheel assemblies affixed thereto, each wheel assembly comprising a plurality of removable spacers adapted to selectively adjust the height of the base with respect to the plurality of wheel assemblies;
    a platform movably connected to the base via a height adjustment mechanism;
    a pair of openings adapted to receive a pair of legs of an occupant therethrough;
    a seat portion that is removably securable to the platform, wherein the seat portion comprises a seat cushion and a seat back, wherein the seat cushion is removably disposed on the platform, wherein the seat cushion includes a forward portion in front of the seat back that covers the pair of openings and a rearward portion extending rearwardly toward a rear end of the platform such that the rearward portion extends underneath the seat back while contacting a rear portion of the platform, wherein the pair of openings are disposed on a lower portion of the seat portion beneath the seat cushion;
    wherein the platform is configured to move between an extended position and a retracted position;
    wherein the platform contacts an upper side of the base when the platform is in the retracted position, and wherein a gap is defined between the base and the platform when the platform is in the extended position.

11. The device of claim 10, wherein the height adjustment mechanism comprises a pair of pivoting connectors each having an upper end connected to the platform and a lower end connected to the base.

12. The device of claim 11, wherein the pivoting connectors extend through a slot on the base.

13. The device of claim 10, wherein the base comprises an annular member defining an open central area.

14. The device of claim 10, wherein the seat back of the seat portion comprises a head cushion affixed thereto.

15. The device of claim 10, further comprising a handle extending rearwardly from a rear end of the platform.

16. The device of claim 15, wherein the handle comprises a handle bar having a pair of perpendicular opposing ends, wherein each opposing end is connected to a telescopically adjustable support arm, such that the handle bar is configured to selectively move between an extended position and a retracted position, wherein each telescopically adjustable support arm contacts a rear side of the seat cushion.

17. The device of claim 10, wherein the platform comprises a tray integral thereto, wherein the tray comprises a raised perimeter lip.

18. The device of claim 17, wherein the tray comprises at least one receptacle thereon.

\* \* \* \* \*